United States Patent
Petrick

(12) 
(10) Patent No.: US 6,535,129 B1
(45) Date of Patent: Mar. 18, 2003

(54) CHAIN OF CUSTODY BUSINESS FORM WITH AUTOMATED WIRELESS DATA LOGGING FEATURE

(75) Inventor: Kathryn D. Petrick, Minneapolis, MN (US)

(73) Assignee: Moore North America, Inc., Stanford, CT (US)

( * ) Notice: Subject to any disclaimer, the term of this patent is extended or adjusted under 35 U.S.C. 154(b) by 0 days.

(21) Appl. No.: 09/714,186

(22) Filed: Nov. 17, 2000

(51) Int. Cl.[7] .............................................. G08B 13/14
(52) U.S. Cl. ................. 340/572.1; 340/572.8; 340/5.81; 340/5.86; 283/75; 283/81; 283/900
(58) Field of Search ........................... 340/572.1, 572.8, 340/825.06, 5.1, 5.8, 5.81, 5.82, 5.86, 10.1, 10.32, 10.42; 283/81, 79, 80, 74, 75, 900, 101

(56) References Cited

U.S. PATENT DOCUMENTS

| | | |
|---|---|---|
| 3,848,112 A | 11/1974 | Weichselbaum et al. .... 235/375 |
| 4,164,320 A | 8/1979 | Irazoqui et al. ............. 235/375 |
| 5,071,168 A | 12/1991 | Shamos ...................... 283/117 |
| 5,135,694 A | 8/1992 | Akahane et al. ............ 264/138 |
| 5,372,386 A | 12/1994 | Mills ........................... 283/67 |
| 5,381,487 A | 1/1995 | Shamos ...................... 382/115 |
| 5,497,140 A | 3/1996 | Tuttle ........................ 340/10.1 |
| 5,581,924 A | 12/1996 | Peterson ...................... 40/633 |
| 5,673,037 A | 9/1997 | Cesar et al. ............. 340/10.32 |
| 5,745,037 A | 4/1998 | Guthrie et al. ........... 340/573.4 |
| 5,785,181 A | 7/1998 | Quartararo, Jr. ............. 209/3.3 |
| 5,805,082 A | 9/1998 | Hassett ....................... 340/928 |
| 5,883,576 A | 3/1999 | De La Huerga ......... 340/573.1 |
| 5,931,764 A | 8/1999 | Freeman et al. ................ 482/4 |
| 5,963,136 A | 10/1999 | O'Brien .................... 340/573.1 |
| 5,973,598 A | 10/1999 | Beigel ...................... 340/572.1 |
| 5,973,600 A | 10/1999 | Mosher, Jr. ............... 340/572.8 |
| 5,976,014 A | 11/1999 | Petrick et al. .................. 426/3 |
| 5,979,941 A | 11/1999 | Mosher, Jr. et al. .......... 283/67 |
| 5,986,562 A | 11/1999 | Nikolich ................... 340/693.5 |
| 6,007,104 A | 12/1999 | Draper ......................... 283/74 |
| 6,018,299 A | 1/2000 | Eberhardt ................. 340/572.7 |
| 6,019,865 A | * 2/2000 | Palmer et al. ............... 156/265 |
| 6,025,784 A | 2/2000 | Mish ....................... 340/693.5 |
| 6,027,027 A | 2/2000 | Smithgall ................... 235/488 |
| 6,158,779 A | * 12/2000 | Petrick ........................ 283/81 |

* cited by examiner

Primary Examiner—Toan Pham
(74) Attorney, Agent, or Firm—Nixon & Vanderhye P.C.

(57) ABSTRACT

A chain of custody form with an associated wireless (e.g., RFID) chip results in data being monitored and filed electronically, minimizes the need for a multi-part form and results in reduced consumable costs to the customer. Samples are no longer lost in transit or within a testing laboratory, as the RFID chip allows for complete tracking of the specimen. Positive location identification is always available. All data may be tracked using the RFID chip which may prompt the collector or other custodian to correctly enter data. The chain of custody is always accurate and is never broken. All data may be shared with all parties electronically including, for example, an employer, a collection site, a medical review officer, a third party administrator, etc. No re-keying of the information is necessary, eliminating multiple steps, reducing the potential for error, and providing increased efficiencies and decreased processing time at reduced costs.

17 Claims, 4 Drawing Sheets

Fig. 3A

| VIENNA PEDIATRIC ASSOCIATES | 0015 US | ACCT. NUMBER | |
|---|---|---|---|
| A DIVISION OF CAPITAL AREA PEDIATRICS, INC. | | DATE | |
| 410 MAPLE AVE., WEST VIENNA, VA 22180 | RFID Chip | APPOINTMENT TIME | TYPE |
| | | VISIT NUMBER | |
| TIN #54-1881904 | | RESPONSIBLE PARTY | |
| PHYSICIAN NAME | PATIENT NAME | | |
| INSURANCE INFORMATION | BIRTHDATE | COMMENTS | |

| CODE | | DESCRIPTION | DX | CODE | DESCRIPTION | DX |
|---|---|---|---|---|---|---|
| NEW | ESTAB | OFFICE VISITS | | | MEDICAL TREATMENTS | |
| 99201 | 99211 | Level 1 (Nursing) | | 95115 | Allergy Injection | |
| 99202 | 99212 | Level 2 | | 95117 | Allergy Injection, Multiple | |
| 99203 | 99213 | Level 3 | | 90780 | IV Infusion Therapy | |
| 99204 | 99214 | Level 4 | | 90782 | Therapeutic Injection | |
| 99205 | 99215 | Level 5 | | J1100 | Decadron, dose: | |
| | | | | J0170 | Epi / Susphrine, dose: | |
| NEW | ESTAB | PREVENTIVE MEDICINE | DX | J2920 | Solu-Medrol, dose: | |
| 99381 | 99391 | Under 1 Year | | J3410 | Vistaril, dose: | |
| 99382 | 99392 | 1 - 4 Years | | 90788 | Injection of Antibiotic | |
| 99383 | 99393 | 5 - 11 Years | | J0696 | Rocephin, dose: | |
| 99384 | 99394 | 12 - 17 Years | | 92567 | Tympanometry | |
| 99385 | 99395 | Over 18 Years | | 94664 | Inhalation Treatment, Initial | |
| | | | | A4616 | Tubing | |
| CODE | | DESCRIPTION | | A4617 | Mouthpiece | |
| | | SPECIAL SERVICES (Additional) | DX | A4620 | Mask | |
| | | | | 94665 | Inhalation Treatment, Subsequent | |
| 99050 | | After Hours Visit | | J7625 | Proventil, dose: | |
| 99052 | | After 10 p.m. Visit | | K0146 | Terbutaline, dose: | |
| 99054 | | Sunday / Holiday Visit | | J7640 | Vaponephrine, dose: | |
| 99058 | | Emergency Visit in the Office | | 16020 | Burn, Local Treatment | |
| | | IMMUNIZATIONS | DX | | PROCEDURES | DX |
| 90700 | | DTaP (Diphtheria, Tetanus, acellular Pertussis) | | 30300* | Removal FB, Nose | |
| 90701 | | DTP (Diphtheria, Tetanus, Pertussis) | | 65205* | Removal FB, Eye | |
| 90702 | | DT (Diphtheria, Tetanus - child) | | 69200 | Removal FB, Ear | |
| 90707 | | MMR (Measles, Mumps, Rubella) | | 10120* | Removal FB (Splinter), Simple | |
| 90712 | | Oral Poliovirus | | 10121 | Removal FB (Splinter), Complicated | |
| 09713 | | Poliomyelitis Injection | | 12011* | Laceration, Face, 2.5 cm or less | |
| 09716 | | Varicella (Chicken Pox) | | 12013* | Laceration, Face, 2.6 cm to 5.0 cm | |
| 09718 | | Td (Tetanus, diphtheria - adult) | | 12001* | Laceration, Other, 2.5 cm or less | |
| 09724 | | Influenza Virus | | 12002* | Laceration, Other, 2.6 cm to 7.5 cm | |
| 90730 | | Hepatitis A, dose: | | J0670 | Carbocaine, dose: | |
| 90744 | | Hepatitis B (0-11 Years) | | A4550 | Surgical Tray | |
| 90745 | | Hepatitis B (11-19 Years) | | 10060* | Incision and Drainage of Abscess | |
| 90737 | | HIB | | 69090 | Ear Piercing | |
| 86580 | | TB, Intradermal | | 23500 | Fracture Care, Clavicle | |
| 86585 | | TB, Mono-Vacc | | L3650 | Clavicle Strap | |
| | | | | 26720 | Fracture Care, Finger | |
| | | LABORATORY | DX | 69420* | Myringotomy | |
| 81002 | | Urinalysis | | 69210 | Removal of Ear Wax | |
| 87086 | | Urine Culture | | 94760 | Pulse Oximetry | |
| 87184 | | Urine Sensitivity | | 94150 | Peak Flow | |
| 86317 | | Rapid Strep ID | | 53670* | Catheterization, bladder | |
| 84030 | | PKU, Blood | | 24640 | Nursemaid Elbow | |
| 36415 | | Blood Draw / Venipuncture | | 17110 | Wart Destruction | |
| 85018 | | Hemoglobin | | | OTHER | DX |
| 87060 | | Throat / NP Culture | | A4570 | Splint, Wrist or Ankle | |
| 87070 | | Ear, Eye, or Soft Tissue Culture | | 99070 | Medical Supply: | |

| DIAGNOSIS | |
|---|---|
| 1. | TOTAL CHARGES ⇨ |
| 2. | PAYMENT RECEIVED: |
| 3. | |
| 4. | TYPE     AMT. |

Fig. 3B

MEDTOX FAX RESULT LINE: 888-295-0466
On site Screening Custody Form - FAX THIS COPY

CO. LOGO Address
Phone #

0015 US

Employer:

STEP 1 To be completed by COLLECTOR / DONOR

Donor Social Security Number _____

Donor's Name
Last Name (or other ID) _____ First Name _____

MRO:

Referring Physician / Company _____
DONOR CONSENT / _____
_____
Signature _____ DATE Month ___ Day ___ Year ___

Account # _____

SPECIMEN ID NO.   SPECIMEN ID NO.   SPECIMEN ID NO.

RFID Chips (PLACE OVER CAP)  (PLACE OVER CAP)  (PLACE OVER CAP)

STEP 2 To be completed by COLLECTOR - Indicate Reason For Test
☐ Pre-employment ☐ Random ☐ Reasonable Suspicion
☐ Return to Duty
☐ Follow-up ☐ Post Accident ☐ Other ( ___ )
Collection Site Phone No. _____

The temperature of the specimen was read within 4 minutes of collection. ☐ Yes, 90° - 100°F / 32 -36°C
☐ Yes ☐ No
☐ No, Record specimen temperature here _____

STEP 3 To be initiated by the PERSON COLLECTING THE SPECIMEN and COMPLETED AS NECESSARY THEREAFTER:
I, the collector, _____

DATE
Month ___ Day ___ Year ___   RELEASED BY: _____   RECEIVED BY: _____   PURPOSE OF CHANGE
Collector's Printed Name _____   TEMPORARY STORAGE   Temporary Storage
Month ___ Day ___ Year ___   Collector's Signature _____
Tester's Printed Name _____   Perform On-Site Test
TEMPORARY STORAGE   Tester's Signature _____

CO. LOGO   CO. LOGO   CO. LOGO

STEP 4 Complete Step 4 ONLY if the on-site test is non-negative
DATE   RELEASED BY PRINTED NAME / SIGNATURE   RECEIVED BY PRINTED NAME / SIGNATURE   PURPOSE OF CHANGE
Month ___ Day ___ Year ___   Collector's Printed Name _____   COURIER   For Transport to MEDTOX
Collector's Signature _____

Date (Mo. Day, Yr.) Doctor's Initial   Date (Mo. Day, Yr.) Doctor's Initial   Date (Mo. Day, Yr.) Doctor's Initial STEP 5 To be completed by person conducting on-site drug test only
RESULTS OF ON-SITE SCREEN TEST: ☐ NEGATIVE ☐ NON-NEGATIVE: REQUIRES ADDITIONAL TESTING
35991
REMARKS CONCERNING COLLECTION / TEST
MEDTOX LABORATORIES CONFIRMATION REQUEST: ( _____ )

O R D E R E D
T E S T

RFID Chips

STEP 6 To be completed by MEDTOX   ☐ SEAL INTACT
DATE   RELEASED BY PRINTED NAME / SIGNATURE   RECEIVED BY PRINTED NAME / SIGNATURE   PURPOSE OF CHANGE
Month ___ Day ___ Year ___
COURIER

THE RESULTS FOR THE ABOVE IDENTIFIED SPECIMEN ARE:
☐ NEGATIVE ☐ POSITIVE, for the following: ☐ _____ ☐ _____ ☐ _____
☐ ___ ☐ ___ ☐ ___ ☐ _____ ☐ _____ ☐ ___
☐ TEST NOT PERFORMED ☐ SPECIMEN INTEGRITY RESULTS OUTSIDE RANGE
_____ ☐ _____ ☐ _____ ☐ ___
_____ ☐ _____ ☐ _____
_____ ☐ _____ ☐ _____
_____ ☐ _____ / /

CHAIN OF CUSTODY BUSINESS FORM WITH AUTOMATED WIRELESS DATA LOGGING FEATURE

FIELD OF THE INVENTION

This invention relates to maintaining a chain of custody for object handling, and more particularly, to a chain of custody form or associated label including a radio frequency identification chip allowing electronic chain of custody form processing.

BACKGROUND AND SUMMARY

Important decisions are often made based on laboratory analyses. For example, a physician will often decide on a diagnosis or a treatment based on lab results. In other contexts, an employer might make a hiring or a firing decision based on the results of a drug test, or a court or jury might decide a legal case based on lab results of a DNA test, blood alcohol test or the like.

Important questions that may arise in these (and other) contexts is whether the laboratory tested the correct sample, and whether the sample was tampered with before it was tested. While the possibility of intentional tampering might seem unlikely, criminal defendants often allege that law enforcement officials and/or laboratory personnel have tampered with incriminating evidence in order to "frame" the defendant. More commonly, there is always the possibility of mixing up samples or test results between different people. Imagine a situation in which samples from two different patients get mixed up—resulting in both patients being given incorrect diagnoses and treatments. It is very important that the laboratory and/or hospital or office personnel responsible should take care to prevent mix-ups from occurring.

The most effective way to avoid such problems is to establish a strict chain of custody for each laboratory sample. Generally, a chain of custody process tracks or audits the sample as it passes through each step. To establish and evidence chain of custody, laboratories commonly use specialized chain of custody forms requiring each and every custodian of a particular sample to certify certain information. For example, the person who collects the sample typically certifies his or her identity and the time and date on which the sample was collected. The courier, common carrier or other entity transporting the sample from the collector to the laboratory may provide, on the same or different form, a certification establishing courier identity, how long the courier had the sample, etc. Seals applied to the sample or its container can establish that no one has tampered with the sample in transit. The laboratory receiving the sample may complete an additional portion of the chain of custody form to evidence when the sample was received and by whom, when the test was performed and by whom—all of which information can be used to establish a very strict evidentiary basis and assurance that the sample has not been mixed up with another sample, has not become stale or spoiled, and has not be tampered with. Commonly-assigned U.S. Pat. No. 5,976,014 to Petrick et al. entitled "Integrity Seal Form/Label Combination" discloses a particularly advantageous business form that can be used to provide evidence of chain of custody and absence of sample tampering.

While existing chain of custody forms and associated procedures are often successful in establishing a rigorous chain of custody that virtually eliminates the possibility of sample mix-ups and tampering, a problem still remains that such existing forms and associated procedures are typically time-consuming to follow and complete. Commonly, each and every custodian of the sample must take the time to complete all of the information required on the chain of custody form. There is often no backup source for missing information—requiring a new sample to be collected and re-tested. In life-threatening or other time-critical situations, the time required for re-testing may mean the difference between a favorable or an unfavorable outcome. In legal contexts, it may be impossible to go back and re-test—so that even a single missing piece of information on the chain of custody form might be outcome-determinative. In addition, chain of custody forms and procedures (like all human endeavors) are subject to human error.

Some ability to perform automatic backup checking and/or to automate some of the chain of custody processes would be highly desirable. While computers and other automation equipment have been used in the past in connection with chain of custody processes, many such arrangements require extensive data entry and/or optical scanning technology to enter data into any of several computer systems used to track the sample and the form. Accordingly, further improvements are possible and desirable.

The present invention overcomes these problems by providing a new chain of custody form and/or associated label that includes a radio frequency identification chip. The radio frequency identification (RFID) chip allows pertinent data to be monitored and filed electronically—minimizing the need for a multi-part form and reducing consumable costs to the customer.

In accordance with one aspect of the invention, data is tracked automatically using the RFID chip. The chip or processes associated therewith can prompt a data collector to enter the data correctly. An unbroken chain of custody can be automatically maintained accurately through automated means. The RFID chip allows data to be shared electronically with various parties (e.g., employer, collection site, medical review officer, and third party administrator) without need to rekey the information. Automatic entry of the data may occur upon the specimen entering the laboratory. Since the RFID chip allows for complete tracking of the specimen, loss of samples in transit or at a lab is minimized and positive identification becomes more reliable.

BRIEF DESCRIPTION OF THE DRAWINGS

These, as well as other features and advantages of this invention, will be more completely understood and appreciated by careful study of the following more detailed description of presently preferred example embodiments of the invention taken in conjunction with the accompanying drawings, of which:

FIGS. 3A and 3B show example chain of custody forms.

DETAILED DESCRIPTION OF PRESENTLY PREFERRED EXAMPLE EMBODIMENTS

Figure 1:
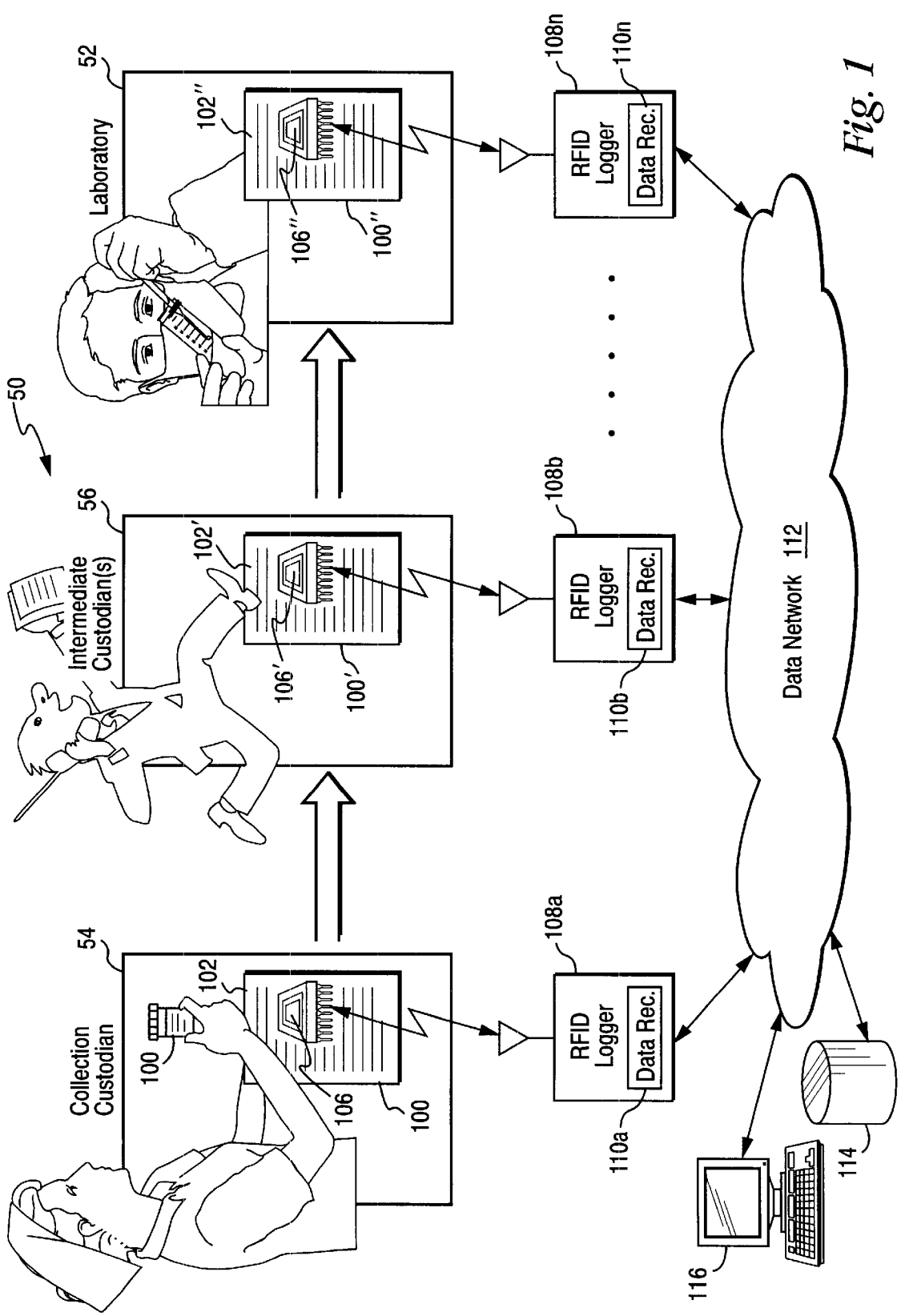
FIG. 1 shows an example preferred embodiment chain of custody data collection system using radio frequency identification chip capabilities.

FIG. 1 shows a chain of custody data collection system 50 provided by an example preferred embodiment of the present invention. This example system 50 is described, for purposes of illustration, in the context of establishing a chain of custody for medical samples being delivered to a laboratory 52 for analysis, but the invention is not to be limited to this particular example.

In the example system 50 shown, a collection custodian 54 such as a nurse or an employer may collect a sample 100 to be tested. The sample may be, for example, a specimen of bodily fluid (e.g., blood, urine, etc.) that the collection custodian 54 seals into a conventional plastic container and matches to a chain of custody form 102 such as described in the above-referenced U.S. Pat. No. 5,976,014. The collection custodian 54 may complete certain information on the chain of custody form 102 using manual and/or automated means to establish the time and date of collection; the name, medical record number and/or other identity of the owner; and other information associated with the sample 100 or its collection.

Unlike in the conventional case, the chain of custody form 102, sample 100 container, and/or associated label is provided with a radio frequency identification (RFID) chip 106. RFID chip 106 is of a conventional design and may include, for example, a conventional active or passive radio frequency transponder that, when queried by an RFID logger 108, responds by wirelessly providing a unique identification value such as a serial number or other arbitrary unique or other distinctive identifier that distinguishes that particular RFID chip (and thus the form 102 and/or sample 100 associated therewith) from other forms and/or samples. Most such conventional RFID chips 106 comprise passive devices that respond with a characteristic signature indicating an identifying number or string upon being exposed to radio waves of the appropriate frequency. Other such known RFID chip arrangements are able to store information sent to them, and to later reveal the information in response to a query. Still other such devices operate based on mechanisms other than radio frequency (e.g., light waves, sound waves, etc.). The present invention is intended to encompass all such variations.

As shown in FIGS. 3A and 3B, one particularly advantageous arrangement is to embed the RFID chip 106 within the form 102 and/or within an associated adhesive label so that it is permanently associated with the form and/or label. In this particular example, to de-associate the RFID chip 106 from the associated form 102 one would need to tear (i.e., destroy) the form—which destruction will be evident immediately upon inspection of the form. Through this mechanism, it is difficult if not impossible in the preferred example embodiment to lose, de-associate or otherwise tamper with the association between RFID chips 106 and associated forms 102. Furthermore, the form or label described in the above-referenced U.S. Pat. No. 5,976,014 with RFID chip 106 affixed thereto can be used to positively associate form or label 102 including RFID chip 106 with a particular sample container 100 so as to establish a positive, permanent association between the RFID chip and the collected sample.

Figure 2:
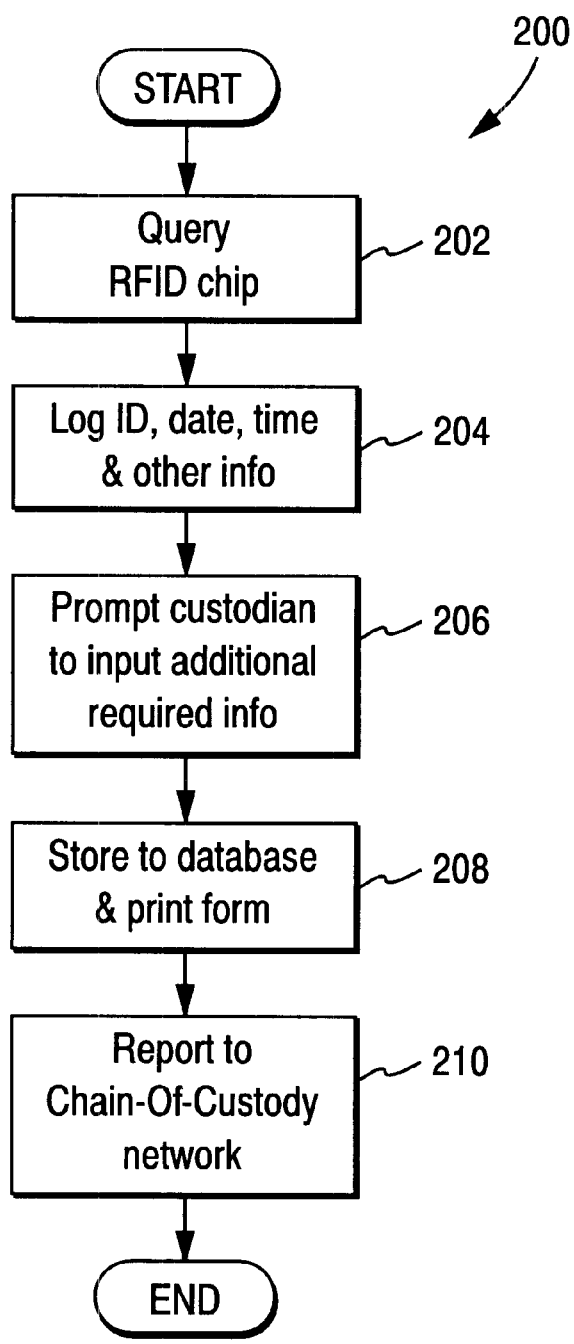
FIG. 2 shows an example chain of custody data logging operation.

FIG. 2 is a flowchart of an example data collection process 200 that may be performed by RFID logger 108 shown in FIG. 1. In the FIG. 2 example, the RFID logger 108 may query the RFID chip 106 (block 202) to receive the RFID chip's identification (and other) information and/or to send information to the RFID chip. The RFID logger 108 (and/or the RFID chip 106 in some arrangements) may log this identification information along with date, time and other pertinent information (block 204).

In one example embodiment, RFID logger 108 may prompt the collection (or other) custodian 54 to input additional required information either manually (e.g., my writing the information onto form 102 using a pen or pencil) and/or automatically (e.g., by inputting information into a computer workstation or other electronic device via a keyboard, barcode scanner, optical character reader, speech recognition device and/or other data input means) (block 206). This additional information may become part of form 102 and/or a data record 110 that RFID logger 108 (and/or chip 106) records. RFID logger 108 may record the collected information onto form 102 and/or in an associated data record 110 (block 208)—which data record is associated with the particular RFID chip 106.

Typically, the collection custodian 54 may, after the data collection process is complete, provide the sample 100 and form 102 (or one or more parts thereof in the case of a multi-part form) with associated RFID chip 106 to an intermediate custodian 56. In one example, intermediate custodian 56 might be a courier entrusted to deliver sample 100 to a laboratory 52. In other contexts, intermediate custodian 56 might be a storage facility such as a records room, some other intermediate handler of the sample, or any other person or entity entrusted with temporary custody of sample 100. There may be any number of intermediate custodians 56.

In the example embodiment shown in FIG. 1, intermediate custodian 56 also has an associated data logger 108 that may query the RFID chip 106 and provide an additional data collection process as shown in FIG. 2—resulting in additional information being provided on form 102 and/or an additional data record 110 that is associated with (and may or may not be stored by) RFID chip 106 and thus also with sample 100.

In the example embodiment, the sample 100 and associated form 102 eventually reaches a laboratory 52 for analysis. In this example system 50, laboratory 52 (as the final link of the chain of custody) also—like all of the other custodians before it—has an RFID logger 108 that queries the RFID chip 106 associated with sample 100 and performs a data collection and recording process as shown in FIG. 2. Laboratory 52 may thus perform automatic logging of sample 100 based on the same identification supplied by RFID chip 106 that the collection custodian 54 (and all intermediate custodians 56) used in their own respective logging processes.

As shown in FIG. 1, one interesting capability provided by system 50 is the ability to exchange data records 110 between custodian sites. For example, each RFID logger 108 may be coupled to the Internet, an enterprise intranet, a local or wide area network, the telephone network, or other data network 112. Data network 112 allows the various data loggers 108 to share automatically collected information and/or record the collected information to a centralized or distributed database facility 114 for archival and management purposes. Data network 112 allows data records 110 associated with an RFID chip 106 to "follow" the RFID chip in the sense that any node connected to the network may (if authorized) access a record tagged to the RFID chip. This capability allows the data record 110 to travel with the RFID chip 106 even though the RFID chip may, in some embodiments, contain no data storage capability of its own beyond an identification string. The centralized or distributed database 114 may be used to, for example, independently establish a chain of custody of sample 100 based on the logging information obtained from RFID chips 106. In one example embodiment, a data terminal 116 (e.g., a workstation, browser-based appliance or other display and data input means) may be used to review and/or print electronic chain of custody audit trail developed by a network of RFID loggers 108. Such a chain of custody audit trail can be used to substantiate the information provided on form 102 and/or to independently establish a chain of custody for sample 100. In one example, a seal affixed to sample 100 into which RFID chip 106 has been embedded and the information automatically logged based upon the RFID chip 106 may be all that is required a sufficient chain of custody for certain purposes.

Several types of forms 102 can be used with the RFID chip 106. For example, the FIG. 3A form comprises a conventional lab work request form that, by itself, does not include enough information to establish a chain of custody for the associated sample. In this particular example, RFID chip 106 is embedded within a label affixed to the FIG. 3A form. The chain of custody associated with sample 100 is in this case provided mostly or exclusively by automatically monitoring and interacting with the RFID chip 106.

The FIG. 3B form includes enough information to establish a strict chain of custody for an associated sample. For example, the form requires the donor, the collector, the temporary storage custodian and the laboratory technician to all supply and write down or print information establishing a chain of custody for the associated sample 100. In addition, the FIG. 3B form includes a separable label portion used for sealing an associated sample 100 container with the donor's initials and the date to prevent tampering. In this particular embodiment, RFID chips 106 are providing within this label for each of three sample 100 containers so as to automatically, independently and individually track the chain of custody of each sample container. Additional, RFID chips 106 may be provided in other portions of the label to, for example, provide laboratory confirmation information, courier information and the like. The FIG. 3B form is especially advantageous for use in drug testing in connection with potential employment or the like.

The chain of custody form 102 with RFID chip 106 results in all data being monitored and filed electronically—minimizing the need for a multi-part form and resulting in reduced consumable costs to the customer. Samples 100 are no longer lost in transit or within laboratory 52, as the RFID chip 106 allows for complete tracking of the specimen. Positive location identification is always available. All data may be tracked using the RFID chip 106 which may prompt the collector 54 or other custodian to correctly enter data. The chain of custody is always accurate and is never broken. All data may be shared with all parties electronically including, for example, an employer, a collection site, a medical review officer, a third party administrator, etc. No re-keying of the information is necessary, eliminating multiple steps, reducing the potential for error, and providing increased efficiencies and decreased processing time at reduced costs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

I claim:

1. A business form comprising:
   a first portion providing chain of custody information therein; and
   a second portion linking said form with at least one specimen;
   wherein said business form further includes a wireless identification device associated therewith that electronically provides at least an identifier in response to a query for automatically establishing the chain of custody of said specimen, said wireless identification device being associated with the form such that de-associating the device from the form results in at least partial destruction of the form in a manner that is readily seen through visual inspection of the form.

2. The business form of claim 1 wherein said wireless identification device comprises an RFID integrated circuit chip embedded within said form.

3. The business form of claim 1 wherein said form includes at least one label, and said wireless identification device is embedded within said label.

4. The business form of claim 1 wherein said form is especially adapted and structured for use with at least one medical specimen.

5. The business form of claim 1 wherein the wireless identification device wirelessly provides an identifier distinguishing said form from other similar forms in response to a wireless query.

6. The business form of claim 1 wherein said wireless identification device is passive or active.

7. The business form of claim 1 wherein said wireless identification device is adhered directly to the specimen or to a container containing the specimen.

8. A method of establishing a chain of custody comprising:
   associating a business form and a radio frequency identification device with at least one object, said wireless identification device being associated with the form such that de-associating the device from the form results in at least partial destruction of the form in a manner that is readily seen through visual inspection of the form; and
   using both the business form and the radio frequency identification device in combination to establish a chain of custody for the object including querying said device and receiving a response that is automatically used to establish said chain of custody.

9. The method of claim 8 wherein the object is a medical specimen.

10. The method of claim 8 wherein said radio frequency identification device is embedded within at least a part of the business form.

11. The method of claim 8 wherein the radio frequency identification device is affixed to at least a part of the business form.

12. The method of claim 8 wherein further including receiving at least identification information from said radio frequency identification device at a plurality of logging stations associated with the custody of said object.

13. A method as in claim 8 wherein further including collecting information wirelessly provided by said radio frequency identification device at a plurality of different sites.

14. The method of claim 8 further comprising reporting information collected from said radio frequency identification device via a data network.

15. The method of claim 8 wherein said radio frequency identification device is affixed to a detachable portion of said business form, and said method includes detaching said detachable portion from said form and applying said detachable portion to said object to provide tamper resistance and chain of custody tracking of the object.

16. The method of claim 8 wherein said radio frequency identification device is affixed to a label associated with said business form.

17. An information managing system comprising:

a plurality of radio frequency identification device logging stations disparately located from one another, each said logging station receiving and logging information provided by a wireless identification device associated with a chain of custody form portion, said wireless identification device being associated with the form portion such that de-associating the device from the form results in at least partial destruction of the form in a manner that is readily seen through visual inspection of the form portion; and a data network allowing said logging stations to communicate with one another and/or with a further, centralized chain of custody database, wherein said logging stations and said network together provide electronic chain of custody information by querying said device and automatically using a response from said device to establish said electronic chain of custody information.

\* \* \* \* \*